United States Patent
Demski et al.

(10) Patent No.: US 11,716,795 B2
(45) Date of Patent: Aug. 1, 2023

(54) METHOD OF CONTROLLING AN AGRICULTURAL VEHICLE LIGHTING SYSTEM AND SYSTEM THEREOF

(71) Applicant: DEERE & COMPANY, Moline, IL (US)

(72) Inventors: Nathan R. Demski, Durango, IA (US); Brian M. Huenink, Cedar Grove, WI (US); Eric A. Keen, Manhattan, KS (US)

(73) Assignee: DEERE & COMPANY, Moline, IL (US)

( * ) Notice: Subject to any disclaimer, the term of this patent is extended or adjusted under 35 U.S.C. 154(b) by 321 days.

(21) Appl. No.: 17/193,716

(22) Filed: Mar. 5, 2021

(65) Prior Publication Data

US 2021/0402918 A1 Dec. 30, 2021

Related U.S. Application Data

(60) Provisional application No. 63/046,004, filed on Jun. 30, 2020.

(51) Int. Cl.
*B60Q 1/24* (2006.01)
*A01B 76/00* (2006.01)
(Continued)

(52) U.S. Cl.
CPC ............... *B60Q 1/24* (2013.01); *A01B 76/00* (2013.01); *B60Q 1/0023* (2013.01);
(Continued)

(58) Field of Classification Search
CPC .... A01B 76/00; B60Q 1/0023; B60Q 1/0088; B60Q 1/24–2696; B60Q 1/50;
(Continued)

(56) References Cited

U.S. PATENT DOCUMENTS 10,195,980 B2  2/2019  Widdowson et al.
10,538,195 B2  1/2020  Fritz et al.
(Continued)

FOREIGN PATENT DOCUMENTS

DE        19839881 A1    3/2000
DE     102010038841 A1    2/2012
(Continued)

OTHER PUBLICATIONS

Demski et al., Implement Recognition Lighting, U.S. Appl. No. 63/017,978, filed Apr. 30, 2020, 88 pages.
(Continued)

*Primary Examiner* — Jason M Han
(74) *Attorney, Agent, or Firm* — Taft Stettinius & Hollister LLP; Stephen F. Rost

(57) ABSTRACT

An agricultural work vehicle for operating in a field includes a chassis, a cab mounted to the chassis, a controller for controlling operation of the work vehicle, and a lighting system including a array field light. The array field light projects a light emission to illuminate a defined zone. A light control module is disposed in electrical communication with the controller and operably controls the at least one array field light. A sensing device senses an area surrounding the work vehicle. The sensing device transmits a signal indicative of a detected object to the controller, which in turn determines if the detected object is in the defined zone. If the detected object is in the defined zone, the light control module controllably adjusts an output from the array field light so that only a portion of the defined zone in which the object is not located is illuminated.

20 Claims, 6 Drawing Sheets

(51) Int. Cl.
   *B60Q 1/00* (2006.01)
   *H05B 45/10* (2020.01)
   *B60Q 1/26* (2006.01)
   *B60Q 1/50* (2006.01)
   *H05B 47/115* (2020.01)

(52) U.S. Cl.
   CPC ......... *B60Q 1/0088* (2013.01); *B60Q 1/2696* (2013.01); *B60Q 1/50* (2013.01); *H05B 45/10* (2020.01); *H05B 47/115* (2020.01); *B60Q 1/247* (2022.05); *B60Q 2800/20* (2022.05)

(58) Field of Classification Search
   CPC .. B60Q 2800/20; H05B 45/10; H05B 47/115; Y02B 20/40
   See application file for complete search history.

(56) References Cited

U.S. PATENT DOCUMENTS

| | | | |
|---|---|---|---|
| 10,829,033 B1 * | 11/2020 | McKinney | ............. B60Q 1/085 |
| 2018/0279539 A1 | 10/2018 | Wågner | |

FOREIGN PATENT DOCUMENTS

| | | |
|---|---|---|
| DE | 102015104928 A1 | 10/2016 |
| DE | 102015112437 A1 | 2/2017 |
| DE | 102017205467 A1 | 8/2018 |
| DE | 102019110098 A1 | 1/2020 |
| EP | 2158799 A1 | 3/2010 |
| WO | WO2019036674 A1 | 2/2019 |

OTHER PUBLICATIONS

Schott et al., Method for Communication between Two Utility Vehicles, unpublished U.S. Appl. No. 17/155,722, filed Jan. 22, 2021, 11 pages.

German Search Report issued in application No. DE102021204305.4, dated Dec. 6, 2021, 5 pages.

* cited by examiner

METHOD OF CONTROLLING AN AGRICULTURAL VEHICLE LIGHTING SYSTEM AND SYSTEM THEREOF

RELATED APPLICATIONS

This application claims the benefit of U.S. Provisional Patent Application Ser. No. 63/046,004, filed Jun. 30, 2020, the disclosure of which is hereby incorporated by reference in its entirety.

FIELD OF THE DISCLOSURE

The present disclosure relates to a lighting system of a work vehicle, and in particular, to a method of controlling the lighting system of the work vehicle.

BACKGROUND

Lighting systems on vehicles are well known and perform numerous tasks. In some instances, conventional lighting systems for on-road vehicles may adjust lighting levels on the basis of other vehicles positioned along a similar path. These lighting systems can offer guidance to an operator who is controlling the steering and operation of the vehicle.

In some ways, these conventional lighting systems are being used in off-road vehicles such as agricultural machines, construction or industrial machines, and forestry machines. As technology continues to evolve and is added to these types of machines, additional in-cabin lights and controls are added for operation by the operator. These additional lights and controls can cause an operator to focus more attention on these controls rather than in a field, on an implement, or areas around the machine. The continuous back-and-forth between monitoring the controls and lights within the cab of the machine and the field being operated in can cause fatigue to the operator and possible errors in the field operation.

A conventional lighting system of a vehicle can often blind operators of other vehicles nearby or those in the area of the vehicle. This may include those operating an implement, other equipment or the like. Further, glare from the lighting system reflecting off an object can be distracting to an operator of the vehicle.

It is therefore desirable to provide a lighting system of a work vehicle that may be controlled automatically or manually to avoid distracting others or an operator of the work vehicle.

SUMMARY

In one embodiment of the present disclosure, an agricultural work vehicle for operating in a field includes a chassis; a cab mounted to the chassis; a controller for controlling operation of the work vehicle; a lighting system of the work vehicle comprising a array field light, the array field light configured to project a light emission to illuminate a zone; a light control module disposed in electrical communication with the controller, the light control module configured to operably control the at least one array field light; a sensing device configured to sense an area surrounding the work vehicle; wherein, upon detecting an object in the area, the sensing device transmits a signal indicative of the detected object to the controller; wherein, the controller determines if the detected object is in the zone; further wherein, if the detected object is in the zone, the light control module controllably adjusts an output from the array field light so that only a portion of the zone in which the object is not located is illuminated.

In another embodiment, a control system of an agricultural work vehicle includes a vehicle controller for controlling the work vehicle; a light control module for controlling a lighting system of the work vehicle, the lighting system including at least a first array field light and a second array field light; a sensing device comprising a camera or sensor for detecting a presence of an object in an area surrounding the work vehicle, the sensing device being in electrical communication with the controller; wherein, the first array field light is operably controllable to project a light emission to illuminate a first zone in the area and the second array field light is operably controllable to project a light emission to illuminate a second zone in the area, the first zone and second zone being different from one another; wherein, upon detecting the object in the area, the sensing device transmits a signal indicative of the detected object to the controller; wherein, the controller determines if the detected object is in the first zone or the second zone; further wherein, if the detected object is in the first zone, the light control module controllably adjusts an output from the first array field light so that only a portion of the first zone in which the object is not located is illuminated; and if the detected object is in the second zone, the light control module controllably adjusts an output from the second array field light so that only a portion of the second zone in which the object is not located is illuminated.

In a further embodiment of the present disclosure, an agricultural work vehicle system for performing a work function in a field includes a work vehicle having a controller for controlling operation of the work vehicle; a lighting system comprising a first array field light and a second array field light, the first array field light configured to project a light emission to illuminate a first zone in the field and the second array field light configured to project a light emission to illuminate a second zone in the field; a light control module disposed in electrical communication with the controller, the light control module configured to operably control the output of the first and second array field lights; a sensing device coupled to the work vehicle and configured to detect an object in the field; an implement coupled to the work vehicle for performing the work function in the field, the implement includes an implement light control module disposed in electrical communication with the controller; an implement lighting system including an implement array field light coupled to the implement, the implement light control module operably controlling an output of a light emission from the implement array field light, wherein the implement array field light is configured to project a light emission to illuminate a third zone in the field; wherein, upon detecting the object in the field, the sensing device transmits a signal indicative of the detected object to the controller; wherein, the controller determines if the detected object is in the first zone, the second zone, or the third zone; further wherein if the detected object is in the first zone, the light control module controllably adjusts an output from the first array field light so that only a portion of the first zone in which the object is not located is illuminated; if the detected object is in the second zone, the light control module controllably adjusts an output from the second array field light so that only a portion of the second zone in which the object is not located is illuminated; and if the detected object is in the third zone, the implement light control module controllably adjusts an output from the third array field light so that only a portion of the third zone in which the object is not located is illuminated.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
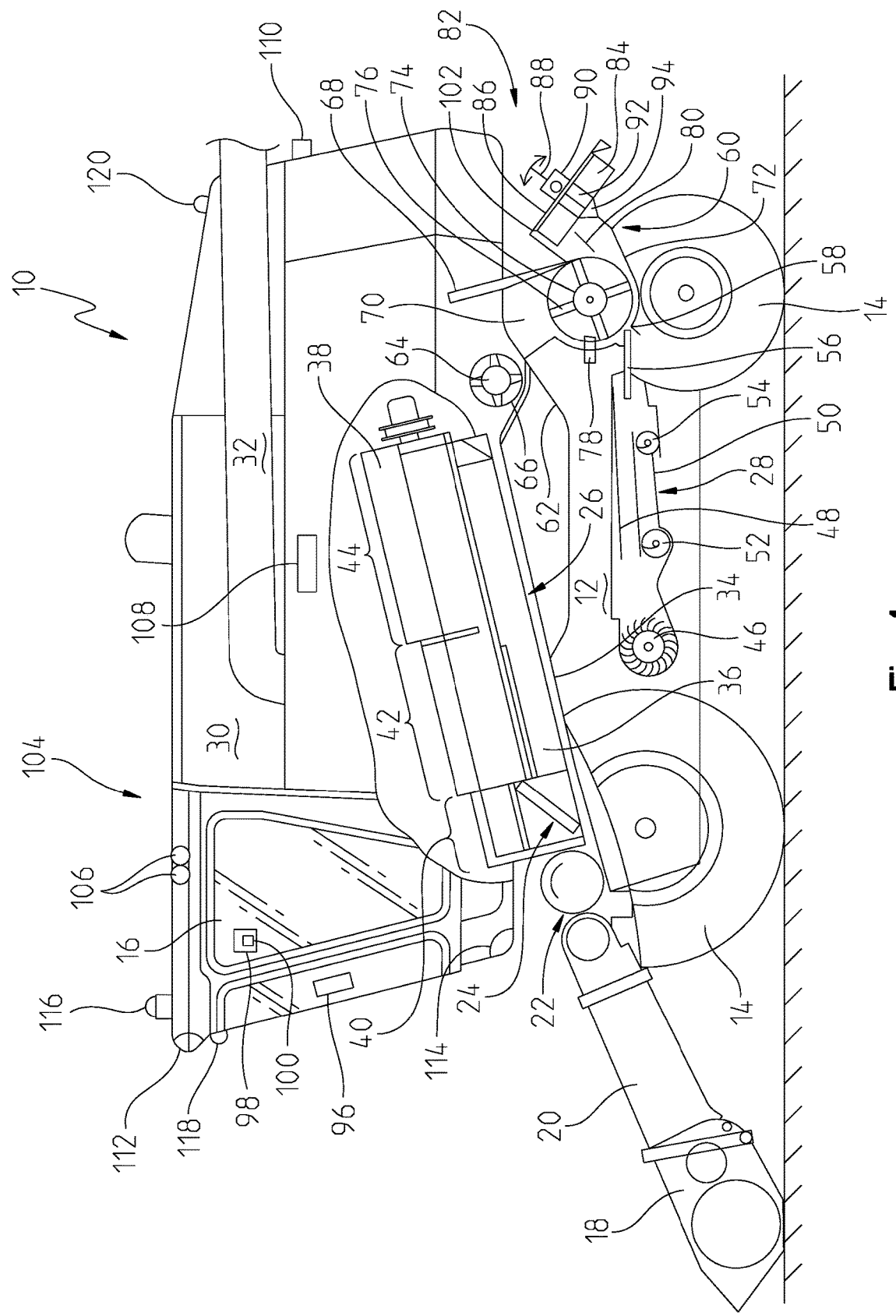
FIG. 1 is a partial section of a side view of an agricultural vehicle with a lighting system according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. One or more of the field lights can be activated individually and varied in terms of their luminous intensity by the vehicle controller 222 for adapting the emission characteristic or light intensity.

In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
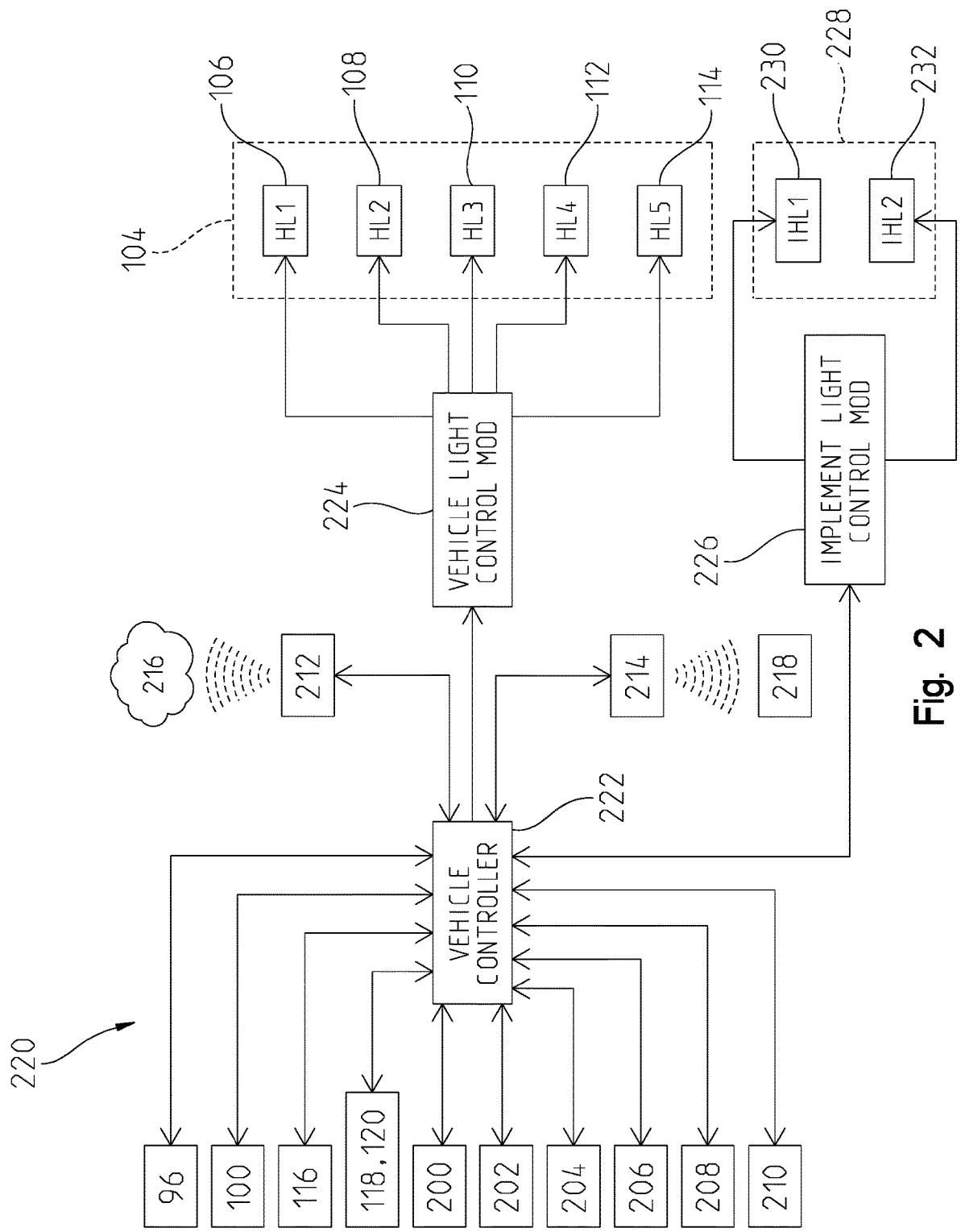
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to another vehicle or an implement, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. Further, the camera 116 may detect an implement being towed by the work machine and communicating this to the controller 222. In one example, the camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles or an implement being towed by the work vehicle in the field, or on a roadway during transport.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206 may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

As shown in FIG. 2, the work vehicle 10 may be capable of towing an implement. For instance, the work vehicle may be a tractor which tows a mowing, planting or spraying implement. In any event, the implement may include its own lighting system. The implement lighting system may be operably controlled by the vehicle controller 222 in the same way as the vehicle lighting system 104. In another embodiment, the implement lighting system may be operably controlled via the vehicle light control module 224.

In yet another embodiment, which is shown in FIG. 2, the implement lighting system may include its own implement light control module 226 for operably controlling the implement lighting system. Here, the implement lighting system 228 may include a first implement array field light 230 and a second LED array implement field light 232. The implement lighting system 228 may include one or more array field lights for projecting a light emission externally from the implement to illuminate areas around the implement.

As described above, conventional lighting systems were controlled to either be turned completely on or off. If a high beam and low beam were available, then a high beam may be used to further illuminate the surrounding environment compared to the low beam. When an oncoming vehicle is detected, the high beam may be switched to the low beam. In doing so, the operator of the oncoming vehicle is not blinded by the light emission of the high beam.

In this disclosure, the light control module 224 of the vehicle and/or the implement light control module 226 may receive communications from the controller 222 and operably control individual pixel segments to project or display light emissions from each of its individual array field lights. Each array field light may be operably controlled independently of the other field lights such that at any given time one or more of the field lights may be operably controlled on or off. As a result, if an oncoming vehicle is approaching, individual pixel segments may be disabled without completing shutting off the entire field light. This can provide advantages such that the surrounding environment may still be illuminated by the lighting system, but the operator of the oncoming vehicle is not blinded. The ability to control the lighting system of the vehicle and implement via matrix lighting technology, along with camera and/or sensor technology to detect the presence of an oncoming vehicle and the like, provides additional benefits over conventional lighting systems.

In the same way, if the operator controlling the work vehicle is distracted or partially blinded due to a glare caused by the lighting system, the present disclosure provides a control system and method for turning off segments of light to reduce the glare and distractions from the operator.

To achieve the aforementioned benefits, the present disclosure provides a high-definition pixel and/or pixel LED lighting system to expand the overall coverage zone of illumination around the work vehicle and implement. This lighting system may improve the visibility of the work vehicle and implement to the operator and to others in or near the coverage zone, particularly as more work vehicles are operating later at night. The lighting system may be operably controlled via control system to that shown in FIG. 2 where individual array field lights may be selectively controlled to modify the light emission therefrom.

In one example of this disclosure, a combination of a combine 10 and grain cart (not shown) may be in the same coverage zone. A camera or sensor may detect the presence of the grain cart such that the lighting system on the combine is operably controlled so that a corresponding array field light does not project a light emission directly at the grain cart operator. Similarly, a lighting system on the grain cart may be operably controlled so that a corresponding array field light does not project a light emission directly at the combine operator. The combination of both lighting systems, however, project sufficient light emission around the respective work vehicles for others to see.

In another example, a pair of tractors may be working in the same field. Each tractor may include a camera or sensor for detecting the presence of the other tractor. Upon doing so, the respective controllers may operably control the lighting systems on each tractor so as not to blind the operators of each tractor.

In the previous examples, it may also be possible for the operator of the combine, grain cart, or either tractor to manually identify the other vehicle and/or control the lighting system so as not to blind the operator of the other vehicle.

In yet another example, a fast strobe sequence of all array field lights may be implemented to help illuminate the work vehicle so that another vehicle in the field or otherwise may clearly see the work vehicle. The fast strobe sequence may utilize a rotation of a field light, flashing, or any other type of lighting sequence.

In a further example, a lighting system of a work vehicle may be interfaced with a lighting system on a towed implement. For instance, a tractor may be pulling a planter through a field such that the tractor lighting system and planter lighting system project light emissions from each array field light to illuminate the field in which they are operating. In this example, the vehicle controller may operably control the planter lighting system to illuminate the field and then operably control the tractor lighting system to illuminate those zones or areas not illuminated by the planter lighting system. The use of matrix lighting may be implemented where individual pixel segments of each array field light may be controlled on to fill in the gaps left by the planter lighting system. The same may be true with using the planter lighting system to fill in gaps not illuminated by the tractor lighting system.

In this most recent example, as the tractor and implement make a turn in the field, logic in the vehicle controller may be executed to control the tractor lighting system and the implement lighting system to cover the intended path of travel through the turn.

Similarly, in another example, a tractor may be towing a mower implement through a field. As the mower moves from one side of the tractor to the other, the controller may operably control the lighting system on the tractor to illuminate the path of the mower as it moves from one side to the other.

Figure 3:
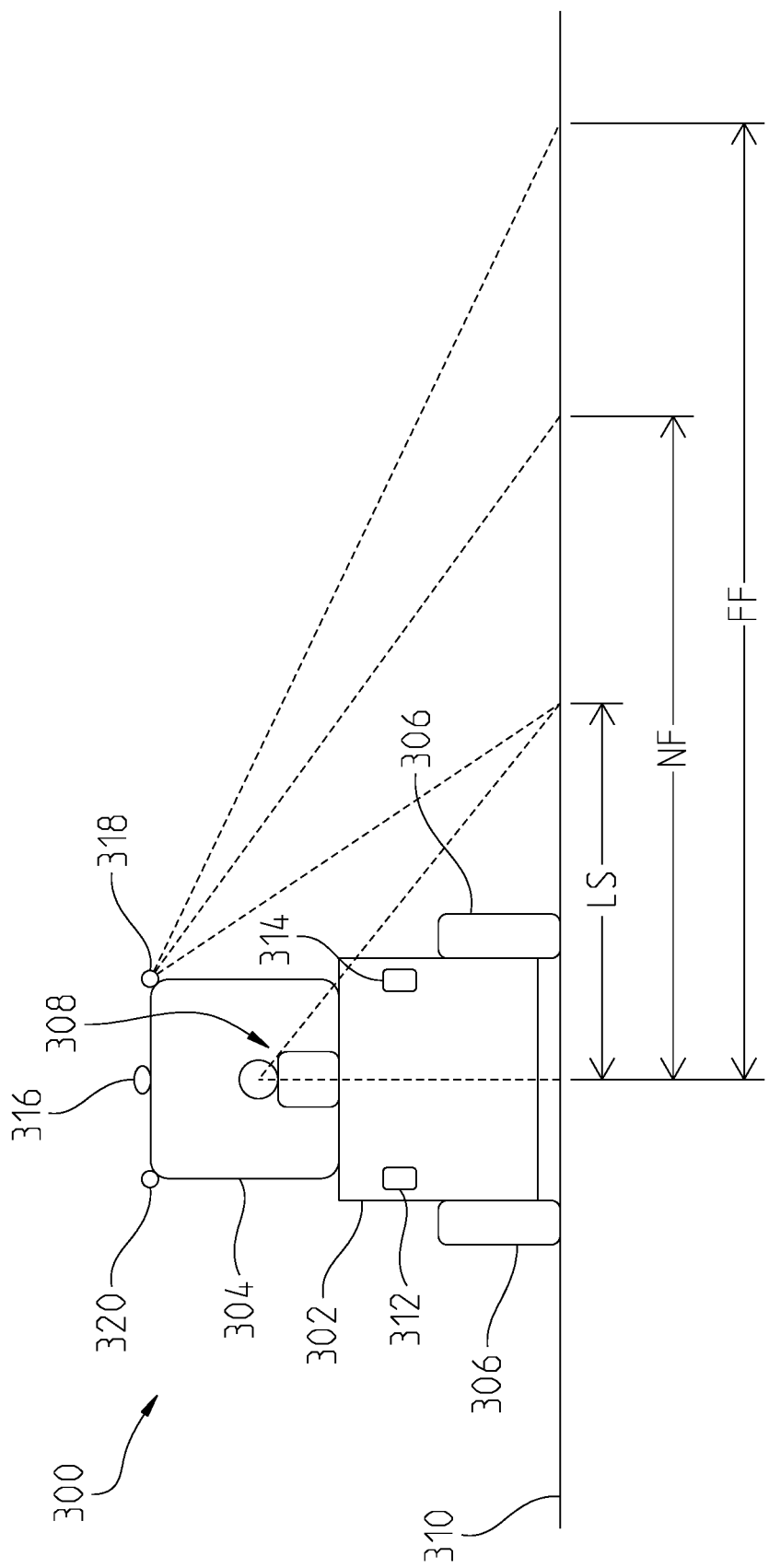
FIG. 3 is a schematic of an agricultural vehicle with a lighting system.

Referring to FIG. 3, for example, an agricultural work vehicle in the form of a tractor 300 is shown. While a tractor 300 is depicted, the work vehicle may include any vehicle in the agricultural, construction, or forestry industries. Further, work vehicles outside of these industries may also be applicable for the sake of this disclosure. The tractor 300 may include a chassis 302 or frame to which a cab 304 is mounted. An operator 308 may be positioned within the cab 304 for controlling the operation of the tractor 300 via one or more controls (not shown). The chassis 302 may be supported on a ground (e.g., a field or roadway) via a plurality of wheels 306.

In this embodiment, the tractor 300 may include a lighting system similar to that described above with reference to FIGS. 1 and 2. In particular, the lighting system may be a high-definition pixel and/or pixel LED lighting system. The lighting system, for example, may include a plurality of array field lights. In FIG. 3, the plurality of array field lights may include a first array field light 312, a second array field light 314, a third array field light 316, a fourth array field light 318, and a fifth array field light 320. The first and second array field lights 312, 314 may be positioned on a front end of the tractor 300, whereas the other array field lights may be positioned at different locations on the cab 304. Additional array field lights may also form part of the lighting system such as including one or more array field lights positioned on a rear end of the tractor 300. The plurality of array field lights are configured to illuminate the entire surrounding area or environment of the tractor 300 to allow the operator 308 to better visualize the field 310 and any objects therein.

As shown in FIG. 3, the operator 308 may be capable of visualizing the field at a distance, LS, from a position within the cab. In one example, this may be approximately a 2-5 meter radius around the tractor 300. The lighting system may be able to illuminate a near field defined by radius, NF, to allow the operator to better see up to a 5-15 meter radius. Further, the lighting system may further be able to illuminate a far field area defined by radius, FF, in FIG. 3. This may allow an operator to see between a 30-50 meter radius from the cab 304. As will be described, if the control system 220 determines that an oncoming vehicle is approaching in the far field area, the control system 220 may be able to operably control the lighting system to shut off the illumination of the far field zone, FF, and only illuminate the areas or zones designated by LS and NF. As a result, the lighting system may not blind the operator of the oncoming vehicle in the far field zone. In doing so, one or more pixels or pixel segments of the fourth array field light 318 in FIG. 3 may be disabled so that the far field zone is not illuminated at least on this side of the tractor 300. By only controlling the fourth array field light 318, however, the other array field lights may continue to illuminate the far field zones without impacting the oncoming vehicle.

Figure 4:
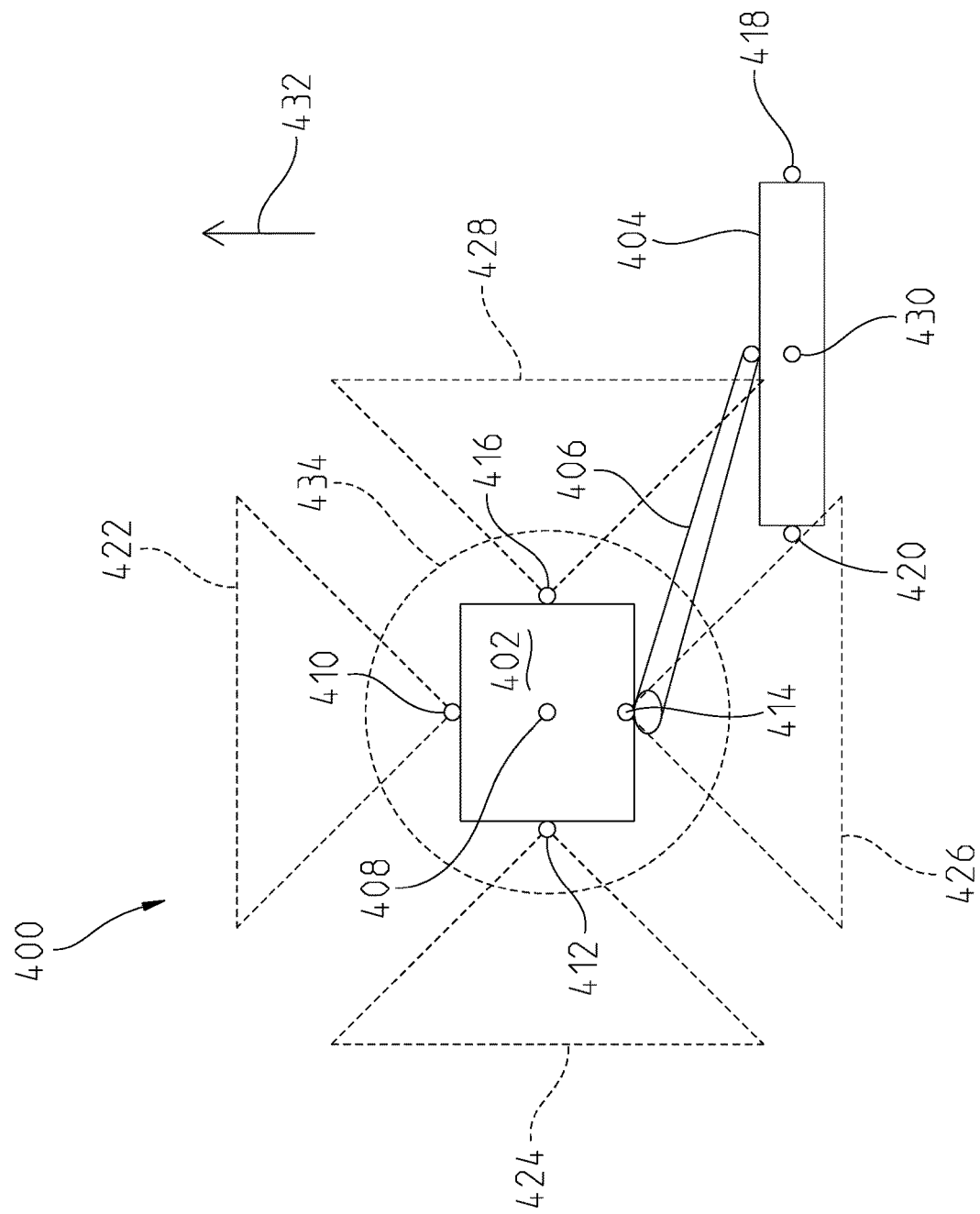
FIG. 4 is a schematic of a combined agricultural vehicle and implement with lighting systems.

In a similar embodiment to that of FIG. 3, another embodiment of a work vehicle is shown in FIG. 4. In this embodiment, a combination 400 of a work vehicle 402 and an implement 404 being towed by the work vehicle 402 is shown. Here, the implement 404 may be towed by a drawbar 406 or other known device. The work vehicle 402 may be a tractor similar to the one in FIG. 3. Alternatively, it may include any vehicle in the agricultural, construction, or forestry industries. Further, work vehicles outside of these industries may also be applicable for the sake of this disclosure. The work vehicle 402 may include a chassis, cab and wheels as described in FIG. 3. Further, the work vehicle 402 may include a lighting system similar to that described in FIGS. 1-3. The lighting system may be a high-definition pixel and/or pixel LED lighting system. The lighting system, for example, may include a plurality of array field lights. In FIG. 4, the plurality of array field lights may include a first array field light 410, a second array field light 412, a third array field light 414, and a fourth array field light 416. Each of the plurality of array field lights may be configured to illuminate different zones or areas around the work vehicle 402.

At least in FIG. 4, the first array field light 410 may be positioned at a front of the work vehicle and project a light emission in a forward direction of travel 432. In doing so, the first array field light 410 may illuminate a first zone 422 in front of the work vehicle 402. The second array field light 412 may be disposed on a first side of the work vehicle 402, and when activated, the second array field light 412 may project a light emission to illuminate a second zone 424 to the first side of the vehicle 402. The third array field light 414 may be positioned on a rear of the work vehicle 402 such that when activated it may project a light emission to illuminate a third zone 426 behind the work vehicle 402. Lastly, the fourth array field light 416 may be positioned on a second side of the work vehicle 402 such that when activated it may project a light emission to illuminate a fourth zone 428 to the second side of the work vehicle 402. Additional array field lights may be disposed on the work vehicle 402 such that as a whole, the lighting system of the work vehicle 402 is able to illuminate the entire environment around the work vehicle when activated.

The work vehicle 402 may also include an additional device 408 located on a roof of the cab, as shown in FIG. 4. The additional device 408 may be a sensor (e.g., proximity sensor) which is able to detect objects such as oncoming vehicle, trees, fences, etc. in the field. Further, the additional device 408 may include a camera for capturing images or video of the surrounding zones and providing feedback to the controller 222 of the control system 220. In turn, these images or video may be displayed for an operator controlling the work vehicle 402 on a screen or other display in the cab. These images or video may also be transmitted by a transmitting device (not shown) to a remote location. This may be particularly useful if the work vehicle is an autonomous vehicle and is controlled remotely or by control logic. The additional device 408 may include another light such as an array field light. In one instance, the additional device 408 may comprise a strobe light so that the work vehicle 402 is detected by others at remote distances therefrom. The additional device 408 may be a combination of the aforementioned devices (e.g., sensor, camera, light). When activated, the additional device may be able to illuminate a fifth area or zone 434 as shown in FIG. 4. If the additional device is a sensor or camera, it may be able to detect or record images/video in a similar area or zone.

It is noteworthy that the zones depicted in FIG. 4 are illustrative of an example and are not intended to be limiting. As technology continues to evolve, one or more array field lights may be capable of outputting the light emission to illuminate all of the zones in FIG. 4. Thus, the number of array field lights may be different for other embodiments, and the area or zone in which the field light may project may be larger or smaller depending on the embodiment.

The implement 430 in FIG. 4 may also include a lighting system. The implement lighting system may be similar to that described and shown in FIG. 2. In FIG. 4, the implement lighting system may include a first implement array field light 418 and a second implement array field light 420. The implement lighting system may comprise a high-definition pixel and/or pixel LED lighting system. The implement may also include an additional device 430 such as a camera, sensor, lighting device or a combination thereof similar to that of the work vehicle. In FIG. 4, the implement lighting system may be disabled such that none of the implement array field lights are active.

Figure 5:
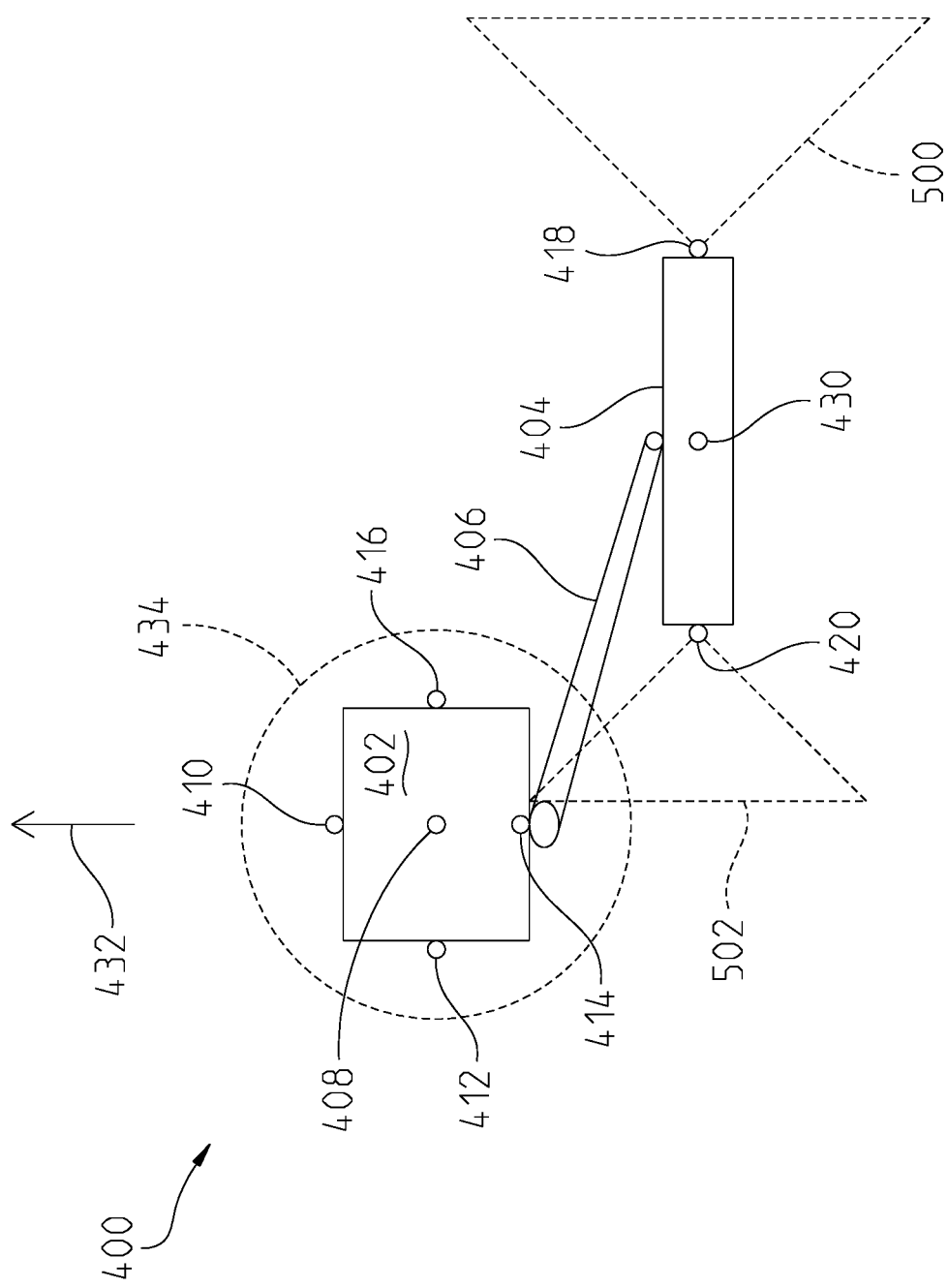
FIG. 5 is another schematic of the combined agricultural vehicle and implement of FIG. 4.

In FIG. 5, however, the implement lighting system is enabled. As shown, the first implement array field light 418 may project a light emission that illuminates a fifth zone 500 and the second implement array field light 420 may project a light emission that illuminates a sixth zone 502. Additional array field lights may be positioned on the implement for emitting light in other directions than what is shown in FIG. 5. In some embodiments, the light emitted from the lighting system of the work vehicle 402 may at least partially overlap with light emitted from the implement lighting system. For example, in FIG. 5, the zone 434 illuminated by the additional device 408 may partially overlap with the fifth zone 502 which is illuminated by the second implement array field light 420. With the combination of the lighting systems of the work vehicle 402 and implement 404, the environment or surrounding area of both may be sufficiently illuminated for the operator to better identify objects and vehicles and also for others to better identify the combination 400.

In the embodiments of FIGS. 4 and 5, the control system for controlling the lighting system of both the work vehicle and implement may include various features. For instance, in one example, a GPS input 204 may alert the controller 222 to the position of the implement 404 relative to the work vehicle 402. In doing so, the controller 222 may operably control the lighting system 104 of the work vehicle 402 and the implement lighting system 228 for adjusting individual array field lights based on the position of each relative to the other. In addition, inputs from a field map 202 may be used for the controller 222 to operably activate or deactivate individual pixels, pixel segments, or field lights as the work vehicle 402 or implement 404 reaches a field boundary or other vehicle. In doing so, lights may be disabled to avoid glare or blinding the operator of the work vehicle or other vehicles.

In another embodiment, the control system 220 may be such that the controller 222 receives inputs from a camera or light sensor 408, 430 from the work vehicle or implement to detect the presence of others. Moreover, the sensor 408, 430 may detect light feedback from another vehicle and adjust the lighting system of both the work vehicle 402 and implement 404 accordingly. In this manner, the lighting systems of the work vehicle and implement may be independently adjusted. For example, the light pattern from a signal array field light may move or be altered based on field boundary, other objects, etc. The light pattern on the field may be dynamic such that it is adjustable. The sensor may also detect glare coming from another vehicle or object, and as a result the controller may adjust individual field lights to reduce or eliminate the glare. This controllability applies to both the lighting systems on the work vehicle 402 and implement 404.

In a further embodiment, the control system 220 may utilize camera-based machine learning where a camera 408, for example, recognizes, adjusts and anticipates light pattern changes. In this embodiment, the lighting system may be catered to the implement 404 and can use various machine inputs to adjust the light pattern being emitted therefrom based on anticipated changes to the work vehicle or implement. Again, the light pattern projected on the field may be dynamic, and other vehicles may be detected such that individual field lights or pixels may be adjusted on or off. In this embodiment, the control system 220 may function autonomously with little to no manual control from an operator.

Figure 6:
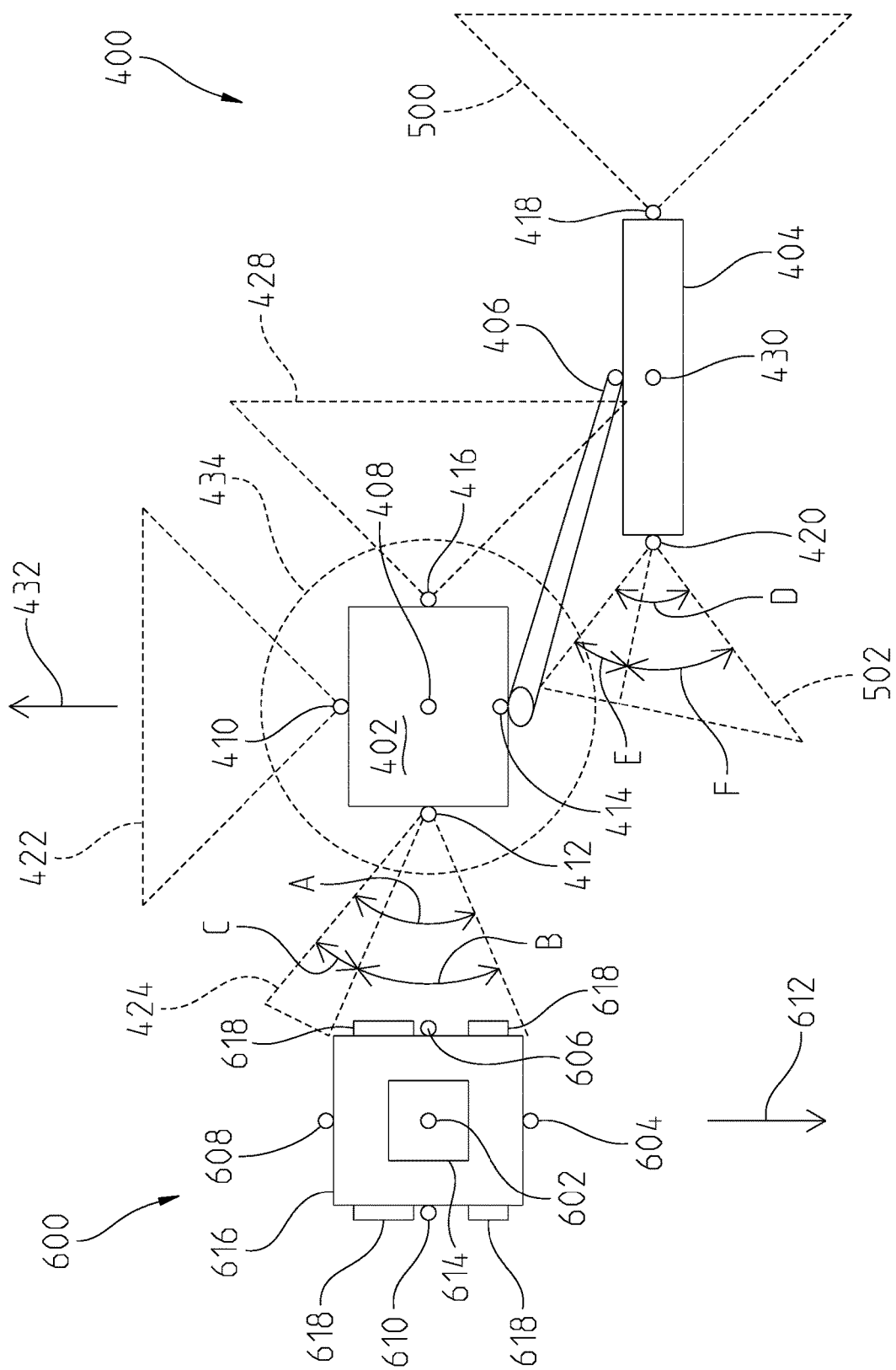
FIG. 6 is a schematic of the combined agricultural vehicle and implement with controlled lighting of the lighting systems to accommodate another work vehicle.

In FIG. 6, an embodiment is illustrated with the combination 400 of the work vehicle 402 and implement 404 of FIGS. 4 and 5. Here, a second work vehicle 600 is shown travelling in the field in a second direction 612, which for purposes of this example only is substantially opposite the forward travel direction 432 of the work vehicle 402. The second work vehicle 600 may include a cab 614 mounted to a chassis or frame 616. The chassis 616 may be supported by a plurality of wheels 618 for traversing the field.

The second work vehicle 600 may include a light, sensor, camera or combination 602 thereof located on the cab 614 or chassis 616. The combination 602 may include a transmitting device and/or receiver capable of communicating with the work vehicle 402 or implement 404. The second vehicle 600 may also include a lighting system including a first light source 604, a second light source 606, a third light source 608, and a fourth light source 610. In other embodiments, the lighting system may include fewer or additional light sources for illuminating areas around the work vehicle 600.

The lighting system of the work vehicle 402 is shown in which the first array field light 410, the second array field light 412, and the fourth array field light 416 are shown projecting a light emission to illuminate the first zone 422, a portion of the second zone 424, and the fourth zone 428. In this example, the third array field light 414 is disabled and is not projecting any light emission.

The lighting system of the implement 404 is activated such that the first implement array field light 418 is projecting a light emission to illuminate the fifth zone 500 and the second implement array field light 420 is projecting a light emission to illuminate a portion of the sixth zone 502.

In this embodiment, the controller 222 may operably receive a signal from the camera or sensor of the additional device 408 regarding a detection of the second work vehicle 600. The camera or sensor may continuously transmit signals to the controller 222 about the position of the second work vehicle 600 relative to both the work vehicle 402 and the implement 404. This information may further come via a GPS input 204 as described above. Thus, a precise location of the second work vehicle 600 relative to the work vehicle 402 and implement 404 may be determined by the controller 222. As a result, the controller 222 may communicate with the vehicle light control module 224 for operably controlling an output of the second array field light 412.

In FIG. 6, the output from the second array field light 412 may correspond to an arc-shaped emission defined as A. When the second array field light 412 is projecting its full light emission, the amount of illumination in the second zone 424 corresponds to the radius A in FIG. 6. However, in FIG. 6, the controller 222 is able to determine from various inputs that the second vehicle 600 is located in a portion of the second zone 424, and it is necessary to reduce the light emission in the area of the second zone 424 from the second array field light 412 so as to not blind the operator of the second work vehicle 600. In FIG. 6, the controller 222 may determine that a radius defined as B of the second zone 424 is where the second vehicle is located. Thus, to reduce the blinding light emission from the second array field light 412, the controller 222 may operably communicate with the vehicle light control module 224 to disable or reduce the output light emission in the area designated by B. As it does, a portion designated as C in the second zone 424 is not occupied by the second work vehicle 600. Thus, the vehicle light control module 224 may operably control the second array field light 412 so that the full light emission is projected into portion C of the second zone 424. The portion C may continue to expand as the work vehicle 402 and second work vehicle 600 move in opposite directions. To vary the output of the second array field light 412, the vehicle light control module 224 may control individual pixels or pixel segments of the field light 412.

In a similar way, the vehicle light control module 224 may disable the third array field light 414 if it is determined that its light emission may blind the operator of the second vehicle 600 or is unnecessary given the illumination coming from the implement lighting system.

The controller 222 may also communicate with the implement light control module 226 to adjust the output from the second implement array field light 420. In FIG. 6, the output from the second implement array field light 420 may correspond to an arc-shaped emission defined as D. When the second implement array field light 420 is projecting its full light emission, the amount of illumination in the sixth zone 502 corresponds to the radius D in FIG. 6. However, in FIG. 6, the controller 222 is able to determine from various inputs that the rear portion of the work vehicle 402 is located in a portion of the sixth zone 502, and it is necessary to reduce the light emission in the area of the sixth zone 502 from the second implement array field light 420 so as to not blind the operator of the work vehicle 402.

In FIG. 6, the controller 222 may determine that a radius defined as E of the sixth zone 502 may reach the rear of the work vehicle 402 and thus blind the operator. Thus, to reduce the blinding light emission from the second implement array field light 420, the controller 222 may operably communicate with the implement light control module 226 to disable or reduce the output light emission in the area designated by E. As it does, a portion designated as F in the sixth zone 502 is not illuminating on the rear of the work vehicle 402 and therefore would not blind the operator. Thus, the implement light control module 226 may operably control the second implement array field light 420 so that the full light emission is projected into portion F of the sixth zone 502. The portion F may be adjusted as the work vehicle 402 and implement 404 make turns in the field or as other objects (e.g., vehicles) enter the sixth zone 502. To vary the output of the second implement array field light 420, the implement light control module 226 may control individual pixels or pixel segments of the field light 420.

In another example, the light control module 224 may adjust the light intensity such as dimming the individual lights or increasing the luminosity, particularly if using white lights or using the white color spectrum.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies are described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle for operating in a field, comprising:
a chassis;
a cab mounted to the chassis;
a controller for controlling operation of the work vehicle;
a lighting system of the work vehicle comprising an array field light, the array field light configured to project a light emission to illuminate a zone;
a light control module disposed in electrical communication with the controller, the light control module configured to operably control the at least one array field light;
a sensing device configured to sense an area surrounding the work vehicle;
wherein, upon detecting an object in the area, the sensing device transmits a signal indicative of the detected object to the controller;
wherein, the controller determines if the detected object is in the zone;
further wherein, if the detected object is in the zone, the light control module controllably adjusts an output from the array field light so that only a portion of the zone in which the object is not located is illuminated.

2. The work vehicle of claim 1, wherein the array field light comprises a high-definition pixel LED lighting module.

3. The work vehicle of claim 1, wherein the sensing device comprises a camera, a proximity sensor, a light, or a combination thereof.

4. The work vehicle of claim 1, wherein the light control module continuously adjusts the output from the array field light as the detected object moves within the zone.

5. The work vehicle of claim 1, wherein the light control module operably enables or disables one or more pixel segments based on a location of the detected object in the zone.

6. The work vehicle of claim 1, further comprising a control system including the controller, the lighting system, the light control module, and a GPS input, the GPS input providing a location of the detected object relative to the work vehicle and the zone.

7. The work vehicle of claim 1, further comprising:
an implement operably coupled to the work vehicle;
an implement lighting system including an implement light control module and an implement array field light coupled to the implement;
wherein, the implement light control module is in electrical communication with the controller for operably controlling an output of a light emission from the implement array field light;
further wherein, the implement light control module operably controls the output from the implement array field light so that the light emission towards the work vehicle is reduced or disabled.

8. The work vehicle of claim 1, wherein the sensing device is configured to detect a glare from the detected object, and the light control module operably adjusts the light emission of the array field light to reduce the glare.

9. The work vehicle of claim 1, wherein the lighting system comprises a second array field light, the second array field light configured to project a light emission to illuminate a second zone;
wherein, the controller determines if the detected object is in the second zone;
further wherein, if the detected object is in the second zone, the light control module controllably adjusts an output from the second array field light so that only a portion of the second zone in which the object is not located is illuminated.

10. The work vehicle of claim 9, wherein:
the controller operably identifies a second portion of the second zone in which the detected objected is located;
the light control module operably controls the output from the second array field light such that the second portion of the second zone is not illuminated.

11. The work vehicle of claim 1, wherein:
the controller operably identifies a second portion of the zone in which the detected objected is located;
the light control module operably controls the output from the array field light such that the second portion of the zone is not illuminated.

12. The work vehicle of claim 1, wherein:
the controller operably identifies a second portion of the zone in which the detected objected is located;
the light control module operably reduces the output from the array field light such that the second portion of the zone is only partially illuminated.

13. A control system of an agricultural work vehicle, comprising:
a vehicle controller for controlling the work vehicle;
a light control module for controlling a lighting system of the work vehicle, the lighting system including at least a first array field light and a second array field light;
a sensing device comprising a camera or sensor for detecting a presence of an object in an area surrounding the work vehicle, the sensing device being in electrical communication with the controller;
wherein, the first array field light is operably controllable to project a light emission to illuminate a first zone in the area and the second array field light is operably controllable to project a light emission to illuminate a second zone in the area, the first zone and second zone being different from one another;
wherein, upon detecting the object in the area, the sensing device transmits a signal indicative of the detected object to the controller;
wherein, the controller determines if the detected object is in the first zone or the second zone;
further wherein,
if the detected object is in the first zone, the light control module controllably adjusts an output from the first array field light so that only a portion of the first zone in which the object is not located is illuminated; and
if the detected object is in the second zone, the light control module controllably adjusts an output from the second array field light so that only a portion of the second zone in which the object is not located is illuminated.

14. The control system of claim 13, wherein the first and second array field lights comprise a high-definition pixel LED lighting module.

15. The control system of claim 13, wherein the light control module continuously adjusts the output from the first or second array field light as the detected object moves within the respective first or second zone.

16. The control system of claim 13, wherein the light control module operably enables or disables one or more pixel segments of the first or second array field light based on a location of the detected object in the respective first or second zone.

17. The control system of claim 13, wherein:
the controller operably identifies a second portion of the first or second zone in which the detected objected is located;
the light control module operably controls the output from the respective first or second array field light such that the second portion of the first or second zone is not illuminated.

18. The control system of claim 13, wherein:
the controller operably identifies a second portion of the first or second zone in which the detected objected is located;
the light control module operably reduces the output from the respective first or second array field light such that the second portion of the first or second zone is only partially illuminated.

19. An agricultural work vehicle system for performing a work function in a field, comprising:
a work vehicle comprising:
a controller for controlling operation of the work vehicle;
a lighting system comprising a first array field light and a second array field light, the first array field light configured to project a light emission to illuminate a first zone in the field and the second array field light configured to project a light emission to illuminate a second zone in the field;
a light control module disposed in electrical communication with the controller, the light control module configured to operably control the output of the first and second array field lights;
a sensing device coupled to the work vehicle and configured to detect an object in the field;
an implement coupled to the work vehicle for performing the work function in the field, the implement comprising:
an implement light control module disposed in electrical communication with the controller;
an implement lighting system including an implement array field light coupled to the implement, the implement light control module operably controlling an output of a light emission from the implement array field light, wherein the implement array field light is configured to project a light emission to illuminate a third zone in the field;
wherein, upon detecting the object in the field, the sensing device transmits a signal indicative of the detected object to the controller;
wherein, the controller determines if the detected object is in the first zone, the second zone, or the third zone;
further wherein:
if the detected object is in the first zone, the light control module controllably adjusts an output from the first array field light so that only a portion of the first zone in which the object is not located is illuminated;
if the detected object is in the second zone, the light control module controllably adjusts an output from the second array field light so that only a portion of the second zone in which the object is not located is illuminated; and
if the detected object is in the third zone, the implement light control module controllably adjusts an output from the third array field light so that only a portion of the third zone in which the object is not located is illuminated.

20. The system of claim 19, wherein, if the sensing device detects a glare from the detected object, the controller operably controls the light control module or the implement light control module to adjust the light emission from the first, second, or third array field lights to reduce the glare.

* * * * *